(12) United States Patent
Watanabe et al.

(10) Patent No.: US 11,351,720 B2
(45) Date of Patent: *Jun. 7, 2022

(54) METHOD FOR MANUFACTURING THREE-DIMENSIONAL SHAPED OBJECT AND THREE-DIMENSIONAL SHAPING DEVICE

(71) Applicant: Seiko Epson Corporation, Tokyo (JP)

(72) Inventors: Yusuke Watanabe, Yokohama (JP); Kei Yokota, Matsumoto (JP)

(73) Assignee: Seiko Epson Corporation

( * ) Notice: Subject to any disclaimer, the term of this patent is extended or adjusted under 35 U.S.C. 154(b) by 103 days.

This patent is subject to a terminal disclaimer.

(21) Appl. No.: 16/886,969

(22) Filed: May 29, 2020

(65) Prior Publication Data
US 2020/0376745 A1 Dec. 3, 2020

(30) Foreign Application Priority Data
May 30, 2019 (JP) .............................. JP2019-101033

(51) Int. Cl.
*B29C 64/118* (2017.01)
*B33Y 10/00* (2015.01)
(Continued)

(52) U.S. Cl.
CPC .......... *B29C 64/118* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/245; B29C 64/118; B29C 64/393; B33Y 10/00
See application file for complete search history.

(56) References Cited

U.S. PATENT DOCUMENTS

2019/0217539 A1* 7/2019 Matsushima ......... B29C 64/112
2019/0358900 A1* 11/2019 Davis .................... B29C 64/106

FOREIGN PATENT DOCUMENTS

JP H04-506110 A 10/1992
JP 2006-192710 A 7/2006
(Continued)

*Primary Examiner* — Joseph S Del Sole
*Assistant Examiner* — Mohamed K Ahmed Ali
(74) *Attorney, Agent, or Firm* — Harness, Dickey & Pierce, P.L.C.

(57) ABSTRACT

A method for manufacturing a three-dimensional shaped object includes: a first shaping step of forming a first layer in contact with a stage provided with a plurality of recessed portions by changing a relative position between a discharge unit and the stage while discharging a molten material from the discharge unit toward the stage; and a second shaping step of stacking one or more layers on the first layer by changing the relative position between the discharge unit and the stage while discharging the molten material from the discharge unit toward the first layer. The stage has a first region where an outer peripheral edge of the first layer is formed and a second region different from the first region in a region where the first layer is formed, and in the first shaping step, the first layer is formed by making a first supply amount which is a supply amount of the molten material supplied from the discharge unit to the first region per unit area larger than a second supply amount which is a supply amount of the molten material supplied from the discharge unit to the second region per unit area.

9 Claims, 13 Drawing Sheets

(51) Int. Cl.
*B29C 64/393* (2017.01)
*B33Y 50/02* (2015.01)
*B33Y 30/00* (2015.01)

(56) References Cited

FOREIGN PATENT DOCUMENTS

| | | |
|---|---|---|
| JP | 2016-203597 A | 12/2016 |
| JP | 2018-183930 A | 11/2018 |
| WO | 89/011085 A1 | 11/1989 |

* cited by examiner

METHOD FOR MANUFACTURING THREE-DIMENSIONAL SHAPED OBJECT AND THREE-DIMENSIONAL SHAPING DEVICE

The present application is based on, and claims priority from JP Application Serial Number 2019-101033, filed May 30, 2019, the disclosure of which is hereby incorporated by reference herein in its entirety.

BACKGROUND

1. Technical Field

The present disclosure relates to a method for manufacturing a three-dimensional shaped object and a three-dimensional shaping device.

2. Related Art

For example, JP-A-2006-192710 describes a technique of shaping a three-dimensional shaped object by extruding a molten thermoplastic material onto a base from a nozzle that scans according to shape data set in advance and further stacking a molten material on the material that is cured on the base.

According to the above technique, the molten material discharged onto a stage may contract when cooled and cured, causing the three-dimensional shaped object to warp. When the three-dimensional shaped object is warped, there is a possibility that a three-dimensional shaped object being shaped is peeled off from the stage, which hinders the shaping or affects a quality of the three-dimensional shaped object.

SUMMARY

According to one embodiment of the present disclosure, a method for manufacturing a three-dimensional shaped object is provided. The method for manufacturing a three-dimensional shaped object includes: a first shaping step of forming a first layer in contact with a stage provided with a plurality of recessed portions by changing a relative position between a discharge unit and the stage while discharging a molten material from the discharge unit toward the stage; and a second shaping step of stacking one or more layers on the first layer by changing the relative position between the discharge unit and the stage while discharging the molten material from the discharge unit toward the first layer. The stage has a first region where an outer peripheral edge of the first layer is formed and a second region different from the first region in a region where the first layer is formed, and in the first shaping step, the first layer is formed by making a first supply amount which is a supply amount of the molten material supplied from the discharge unit to the first region per unit area larger than a second supply amount which is a supply amount of the molten material supplied from the discharge unit to the second region per unit area.

DESCRIPTION OF EXEMPLARY EMBODIMENTS

A. First Embodiment

Figure 1:
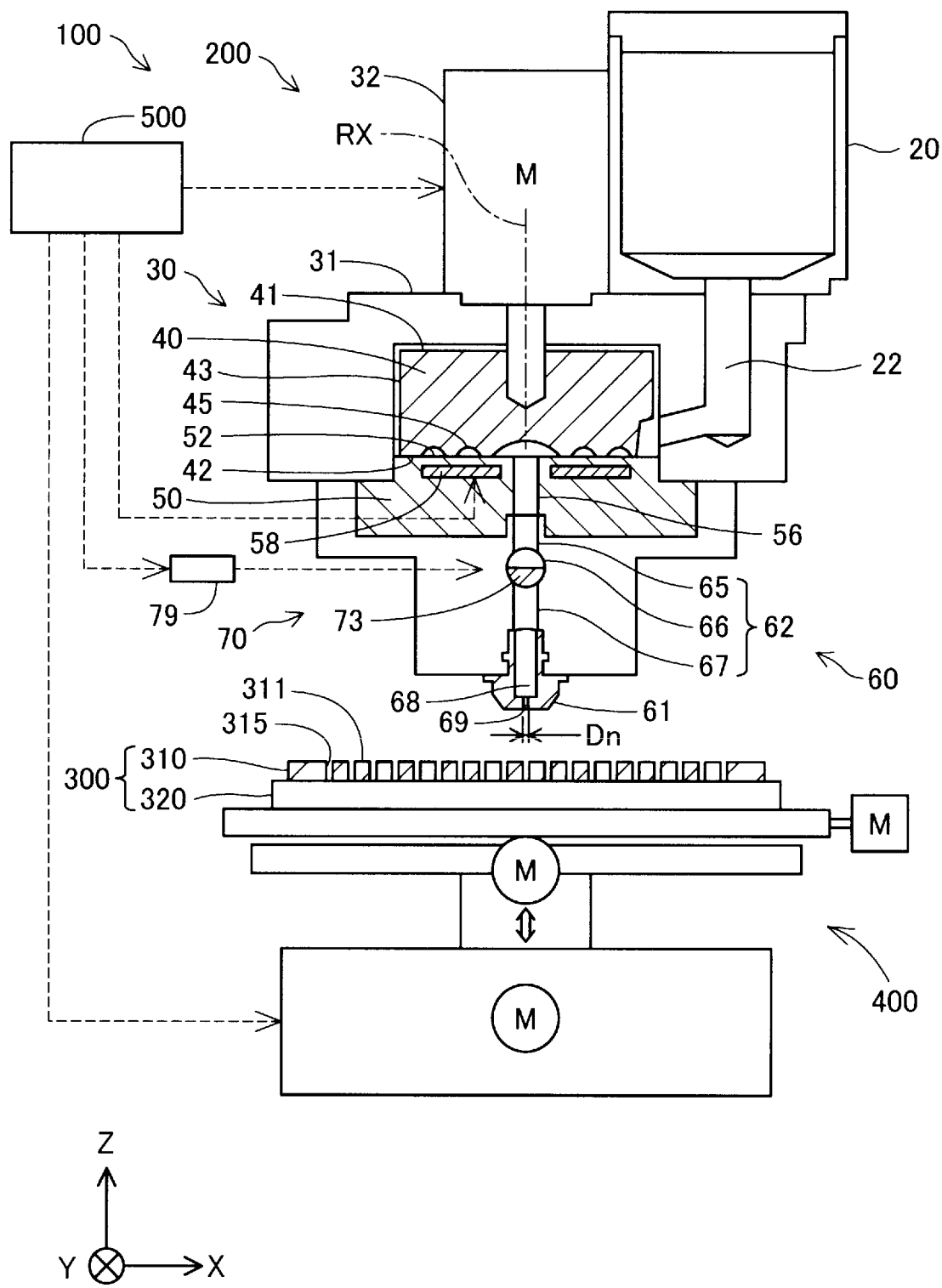
FIG. 1 is a diagram showing a schematic configuration of a three-dimensional shaping device according to a first embodiment.

FIG. 1 is a diagram showing a schematic configuration of a three-dimensional shaping device 100 according to a first embodiment. FIG. 1 shows arrows along X, Y, and Z directions orthogonal to each other. The X direction and the Y direction are directions along a horizontal direction, and the Z direction is a direction along a vertical direction. In other figures, the arrows along the X, Y, and Z directions are appropriately shown. The X, Y, Z directions in FIG. 1 and the X, Y, Z directions in other figures represent the same direction.

The three-dimensional shaping device 100 according to the present embodiment includes a shaping unit 200, a stage 300, a moving mechanism 400, and a control unit 500. Under control of the control unit 500, the three-dimensional shaping device 100 shapes a three-dimensional shaped object in which layers of shaping materials are stacked by driving the moving mechanism 400 to change a relative position between a nozzle hole 69 and the stage 300 while discharging the shaping materials from the nozzle hole 69 provided in the shaping unit 200 toward the stage 300. The shaping material is sometimes called a molten material. A detailed configuration of the shaping unit 200 will be described later.

The stage 300 includes a plate portion 310 and a base portion 320 that supports the plate portion 310. The plate portion 310 has the shaping surface 311 facing the nozzle hole 69. The shaping material discharged from the nozzle hole 69 is stacked on the shaping surface 311. The stage 300 includes a recessed portion 315. The recessed portion 315 means a portion in which the shaping surface 311 is recessed by providing a recess or a through hole in the plate portion 310. In the present embodiment, a plurality of through holes having opening portions on the shaping surface 311 are provided in the plate portion 310, and by combining the plate portion 310 and the base portion 320, a plurality of recessed portions 315 in which the shaping surface 311 is recessed are formed in the stage 300. A specific configuration of the stage 300 on a shaping surface 311 side will be described later.

The moving mechanism 400 changes the relative position between the nozzle hole 69 and the shaping surface 311. According to the present embodiment, the moving mechanism 400 changes the relative position between the nozzle hole 69 and the shaping surface 311 by moving the stage 300 with respect to the shaping unit 200. The moving mechanism 400 according to the present embodiment is implemented by a three-axis positioner that moves the stage 300 in three axial directions of the X, Y, and Z directions by drive forces of three motors. Each motor is driven under the control of the control unit 500. The moving mechanism 400 may be configured to change the relative position between the nozzle hole 69 and the shaping surface 311 by moving the shaping unit 200 without moving the stage 300, instead of moving the stage 300. In addition, the moving mechanism 400 may be configured to change the relative position between the nozzle hole 69 and the shaping surface 311 by moving both the stage 300 and the shaping unit 200.

The control unit 500 is implemented by a computer including one or more processors, a main storage device, and an input and output interface for inputting and outputting signals to and from an outside. According to the present embodiment, the control unit 500 controls operations of the shaping unit 200 and the moving mechanism 400 by the processor executing a program or a command read in the main storage device, so as to execute a shaping process for shaping a three-dimensional shaped object. The operations include changing a three-dimensional relative position between the shaping unit 200 and the stage 300. The control unit 500 may be implemented by a combination of a plurality of circuits instead of a computer.

The shaping unit 200 includes a material supply unit 20 that is a material supply source, a melting unit 30 that melts a material supplied from the material supply unit 20 into a shaping material, a discharge unit 60 having the nozzle hole 69 that discharges the shaping material supplied from the melting unit 30, and a discharge amount adjusting mechanism 70 that adjusts a flow rate of the shaping material discharged from the nozzle hole 69.

A material in a state of pellets, powder, or the like is accommodated in the material supply unit 20. According to the present embodiment, a pellet-shaped ABS resin is used as the material. The material supply unit 20 according to the present embodiment is implemented by a hopper. Below the material supply unit 20, a supply path 22 that couples the material supply unit 20 and the melting unit 30 is provided. The material supply unit 20 supplies the material to the melting unit 30 via the supply path 22.

The melting unit 30 includes a screw case 31, a drive motor 32, a flat screw 40, and a barrel 50. The melting unit 30 melts at least a part of a solid-state material supplied from the material supply unit 20, converts the material into a paste-shaped shaping material having fluidity, and supplies the material to the discharge unit 60.

The screw case 31 is a housing for accommodating the flat screw 40. The barrel 50 is fixed to a lower surface of the screw case 31, and the flat screw 40 is accommodated in a space surrounded by the screw case 31 and the barrel 50. The drive motor 32 is fixed to an upper surface of the screw case 31. A rotation shaft of the drive motor 32 is coupled to an upper surface 41 side of the flat screw 40. The drive motor 32 is driven under the control of the control unit 500.

The flat screw 40 has a substantially columnar shape whose height in a direction along a central axis RX is smaller than a diameter thereof. The flat screw 40 is disposed in the screw case 31 such that the central axis RX is parallel to the Z direction. The flat screw 40 rotates around the central axis RX in the screw case 31 due to a torque generated by the drive motor 32. The flat screw 40 includes a groove forming surface 42 at which groove portions 45 are formed on a side opposite to the upper surface 41 in the direction along the central axis RX. A specific configuration of the flat screw 40 on a groove forming surface 42 side will be described later.

The barrel 50 is disposed below the flat screw 40. The barrel 50 includes a screw facing surface 52 that faces the groove forming surface 42 of the flat screw 40. The barrel 50 is provided with a communication hole 56 that communicates with the discharge unit 60 on the central axis RX of the flat screw 40. The barrel 50 is provided with a heater 58 at a position facing the groove portion 45 of the flat screw 40. A temperature of the heater 58 is controlled by the control unit 500. A specific configuration of the barrel 50 on a screw facing surface 52 side will be described later.

The discharge unit 60 is fixed to a lower surface of the barrel 50. The discharge unit 60 includes a supply flow path 62 and a nozzle 61. The supply flow path 62 communicates between the melting unit 30 and the nozzle 61, and supplies the shaping material from the melting unit 30 to the nozzle 61.

The supply flow path 62 includes a first supply port 65, a cross hole 66, and a second supply port 67. The first supply port 65 extends in the vertical direction. An upper end of the first supply port 65 is coupled to the communication hole 56 of the barrel 50, and a lower end of the first supply port 65 is coupled to the cross hole 66. The cross hole 66 extends in the horizontal direction. The cross hole 66 accommodates a valve portion 73 of the discharge amount adjusting mechanism 70 described later. The second supply port 67 extends in the vertical direction. An upper end of the second supply port 67 is coupled to the cross hole 66, and a lower end of the second supply port 67 is coupled to the nozzle 61. The shaping material supplied from the communication hole 56 of the barrel 50 to the first supply port 65 flows in an order of the cross hole 66, the second supply port 67, and the nozzle 61.

The nozzle 61 is provided with a nozzle flow path 68 and the nozzle hole 69. The nozzle flow path 68 is a flow path provided in the nozzle 61. The nozzle flow path 68 is coupled to the second supply port 67. The nozzle hole 69 is a portion in which a flow path cross section provided at an end portion on a side of the nozzle flow path 68 communicating with atmosphere is reduced. The shaping material supplied from the second supply port 67 to the nozzle flow path 68 is discharged from the nozzle hole 69. According to the present embodiment, an opening shape of the nozzle hole 69 is a circle. A diameter of an opening portion of the nozzle hole 69 is called a nozzle diameter Dn. The opening shape of the nozzle hole 69 is not limited to a circle, and may be a square or the like. When the opening shape of the nozzle hole 69 is a square, a length of one side of the square is called the nozzle diameter Dn. The opening shape of the nozzle hole 69 may be a polygon other than the square.

The discharge amount adjusting mechanism 70 includes the valve portion 73 disposed in the cross hole 66, and a valve drive unit 79 configured to rotate the valve portion 73. The valve drive unit 79 is implemented by an actuator such as a stepping motor, and rotates the valve portion 73 in the cross hole 66 under the control of the control unit 500. The discharge amount adjusting mechanism 70 adjusts a flow rate of the shaping material discharged from the nozzle hole 69 by rotating the valve portion 73 to adjust the flow rate of the shaping material flowing from the first supply port 65 to the second supply port 67. The flow rate of the shaping material discharged from the nozzle hole 69 is also called a discharge amount. A specific configuration of the discharge amount adjusting mechanism 70 will be described later.

Figure 2:
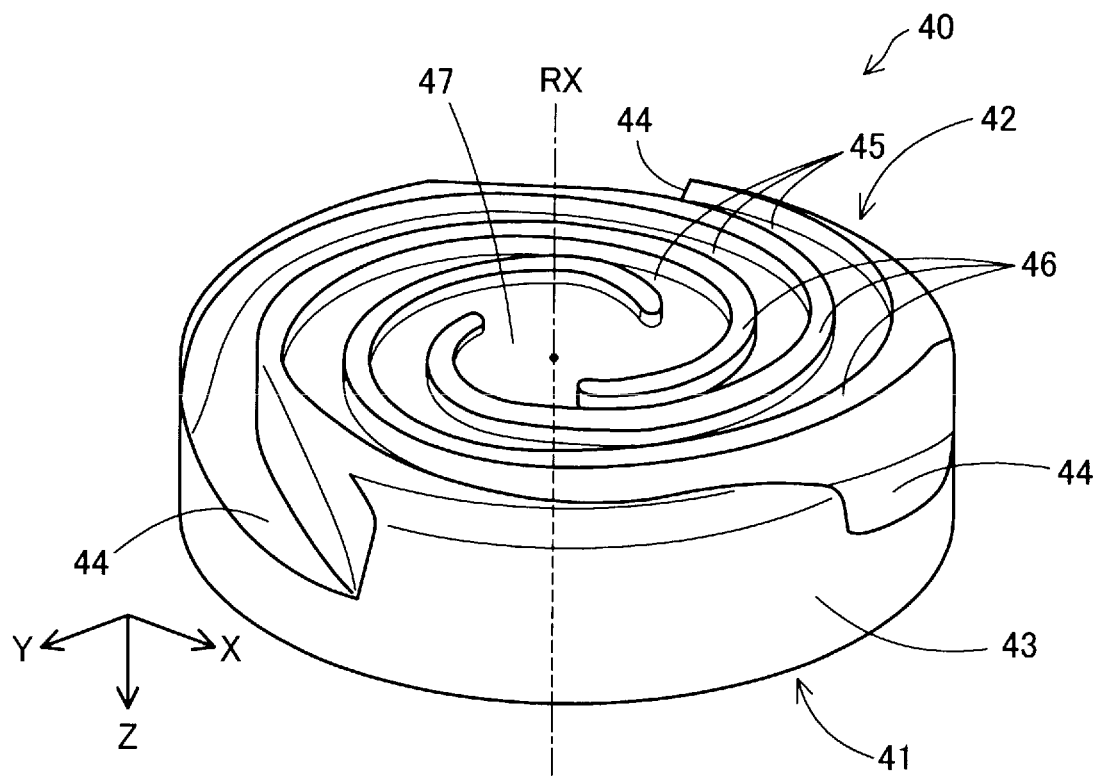
FIG. 2 is a schematic perspective view showing a configuration of a flat screw on a groove forming surface side.

FIG. 2 is a schematic perspective view showing the configuration of the flat screw 40 on the groove forming surface 42 side. In FIG. 2, a position of the central axis RX of the flat screw 40 is shown by a dashed line. As described with reference to FIG. 1, the groove portion 45 is provided in the groove forming surface 42.

A central portion 47 of the groove forming surface 42 of the flat screw 40 is implemented as a recess to which one end of the groove portion 45 is coupled. The central portion 47 faces the communication hole 56 of the barrel 50 shown in FIG. 1. The central portion 47 crosses the central axis RX.

The groove portion 45 of the flat screw 40 forms a so-called scroll groove. The groove portion 45 extends spirally from the central portion 47 toward an outer periphery of the flat screw 40 so as to draw an arc. The groove portion 45 may be configured to extend spirally. The groove forming surface 42 is provided with ridge portions 46 that form a side wall portion of the respective groove portions 45 and extends along the respective groove portions 45.

The groove portion 45 extends to a material introduction port 44 formed in a side surface 43 of the flat screw 40. The material introduction port 44 is a portion that receives the material supplied via the supply path 22 of the material supply unit 20.

FIG. 2 shows an example of the flat screw 40 including three groove portions 45 and three ridge portions 46. The number of the groove portions 45 or the ridge portions 46 provided on the flat screw 40 is not limited to three. The flat screw 40 may be provided with only one groove portion 45, or may be provided with two or more groove portions 45. Any number of the ridge portions 46 may be provided in accordance with the number of the groove portions 45.

FIG. 2 illustrates an example of the flat screw 40 in which the material introduction port 44 is formed at three places. The number of the material introduction port 44 provided in the flat screw 40 is not limited to three. In the flat screw 40, the material introduction port 44 may be provided at only one place, or may be provided at two or more places.

Figure 3:
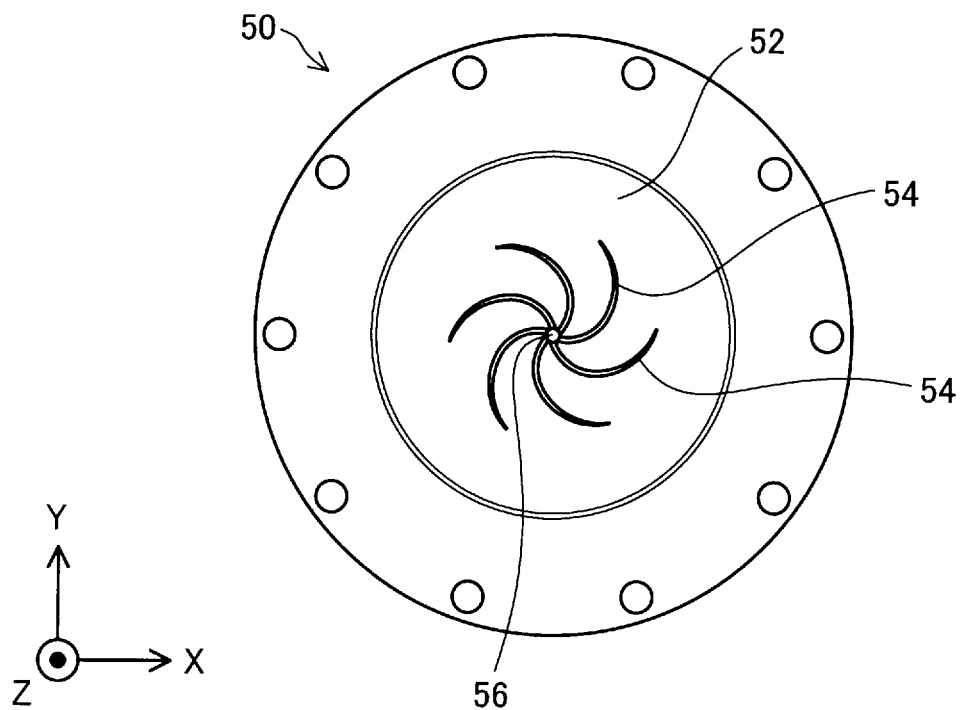
FIG. 3 is a top view showing a configuration of a barrel on a screw facing surface side.

FIG. 3 is a top view showing the configuration of the barrel 50 on the screw facing surface 52 side. As described above, the communication hole 56 that communicates with the discharge unit 60 is formed at a center of the screw facing surface 52. A plurality of guide grooves 54 are formed around the communication hole 56 in the screw facing surface 52. The guide groove 54 has one end coupled to the communication hole 56, and extends spirally from the communication hole 56 toward an outer periphery of the screw facing surface 52. The guide groove 54 has a function of guiding the shaping material to the communication hole 56.

Figure 4:
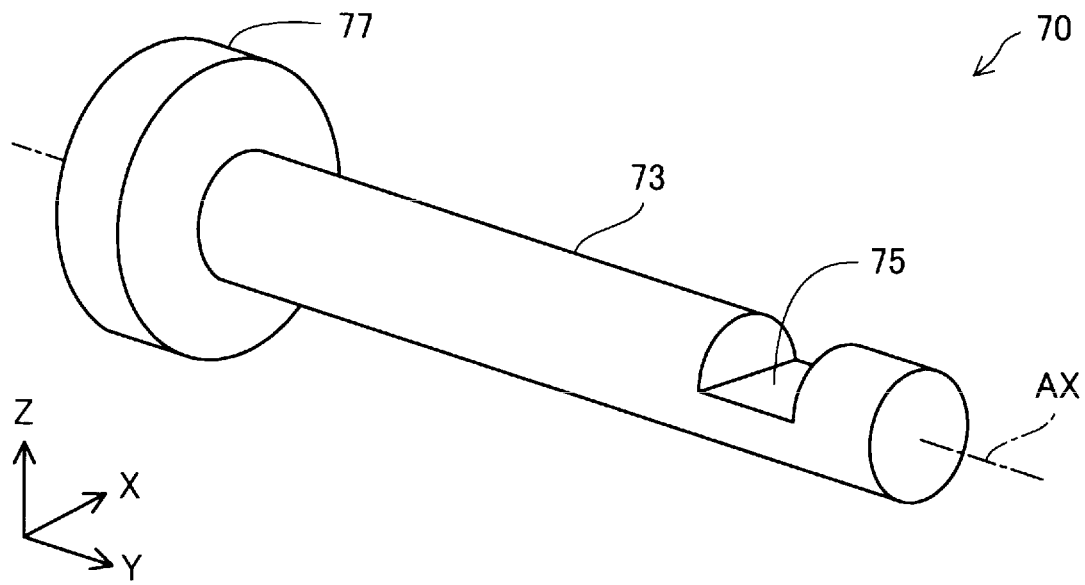
FIG. 4 is a perspective view showing a configuration of a valve portion of a discharge amount adjusting mechanism.

FIG. 4 is a perspective view showing a configuration of the valve portion 73 of the discharge amount adjusting mechanism 70. As described above, the discharge amount adjusting mechanism 70 includes the valve portion 73 disposed in the cross hole 66. The valve portion 73 has a columnar shape centered on a central axis AX. The valve portion 73 is provided with a cutout portion 75 by cutting out a part of a columnar outer periphery in a half-moon shape. An operation portion 77 is provided at an end portion of the valve portion 73 on a −Y direction side. The valve drive unit 79 is coupled to the operation portion 77. When a torque from the valve drive unit 79 is applied to the operation portion 77, the valve portion 73 rotates. The cutout portion 75 may be called a flow passage.

Figure 5:
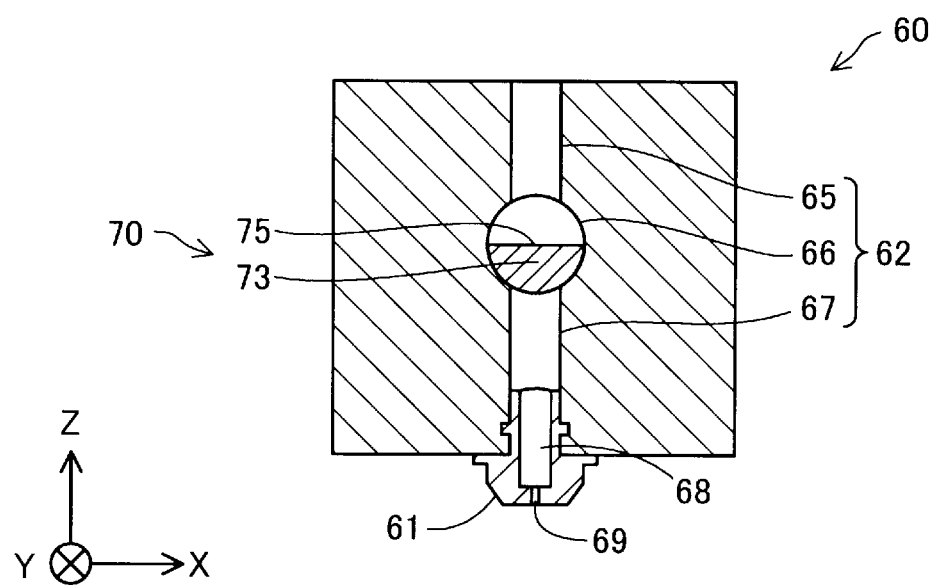
FIG. 5 is a first diagram showing an operation of the valve portion of the discharge amount adjusting mechanism.
Figure 6:
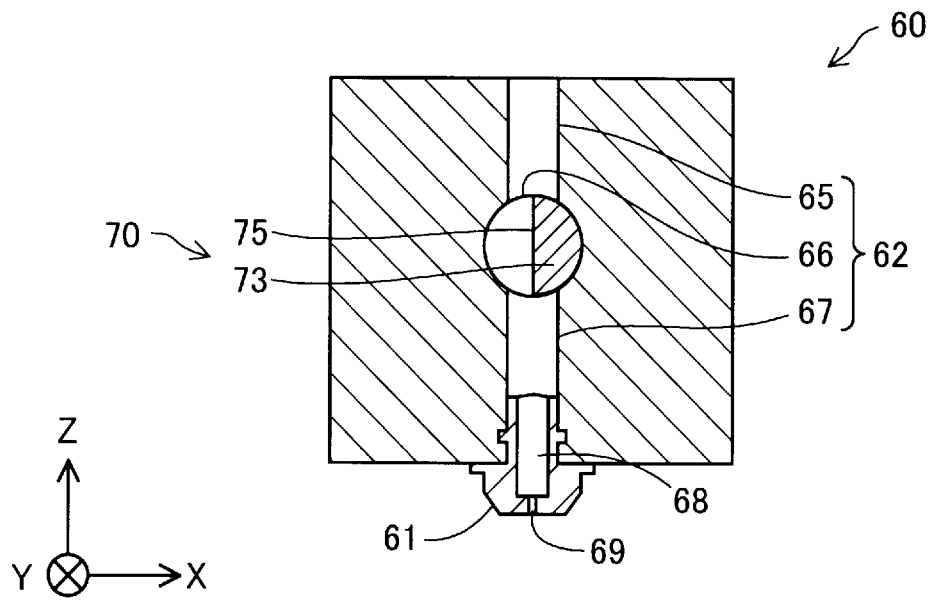
FIG. 6 is a second diagram showing an operation of the valve portion of the discharge amount adjusting mechanism.

FIG. 5 is a first diagram showing an operation of the valve portion 73 of the discharge amount adjusting mechanism 70. FIG. 6 is a second diagram showing an operation of the valve portion 73 of the discharge amount adjusting mechanism 70. As shown in FIG. 5, when the valve portion 73 rotates such that the cutout portion 75 is located upward, the second supply port 67 is closed by the valve portion 73, and a flow of the shaping material from the first supply port 65 to the second supply port 67 is blocked. On the other hand, as shown in FIG. 6, when the valve portion 73 rotates such that the cutout portion 75 faces a +X direction or a −X direction, the first supply port 65 communicates with the second supply port 67, and the shaping material flows from the first supply port 65 to the second supply port 67 at a maximum flow rate. The discharge amount adjusting mechanism 70 changes a flow path cross-sectional area between the first supply port 65 and the second supply port 67 in accordance with the rotation of the valve portion 73, and changes a flow rate of the shaping material flowing from the first supply port 65 to the second supply port 67. The discharge amount adjusting mechanism 70 may be implemented by, for example, agate valve, a globe valve, or a ball valve, instead of the valve portion 73 described above.

Figure 7:
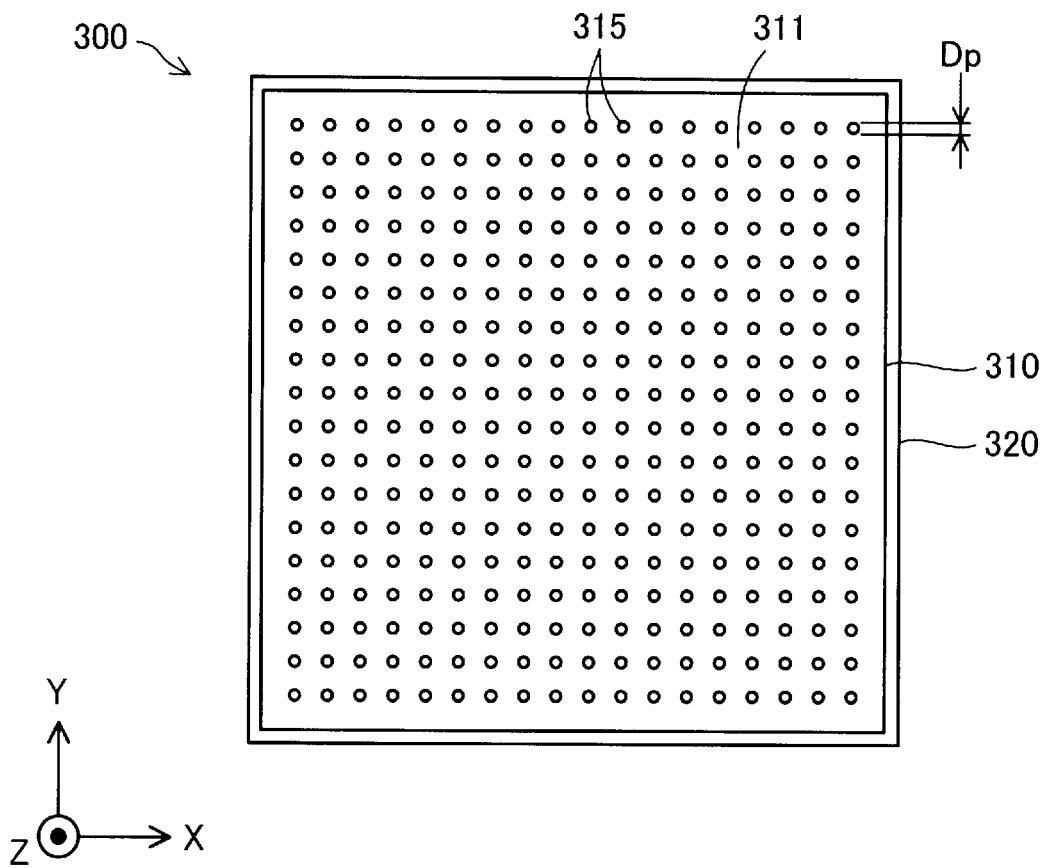
FIG. 7 is a top view showing a configuration of a stage on a shaping surface side according to the first embodiment.

FIG. 7 is a top view showing the configuration of the stage 300 on the shaping surface 311 side. According to the present embodiment, the plate portion 310 is implemented by a square plate-shaped member. The plate portion 310 has the shaping surface 311 on an upper surface on which shaping materials are stacked. The plate portion 310 is provided with a plurality of recessed portions 315 having opening portions on the shaping surface 311. The opening portions of the plurality of recessed portions 315 are arranged in a grid on the shaping surface 311. On the shaping surface 311, a plurality of recessed portions 315 are arranged at regular intervals along the X direction, and a plurality of recessed portions 315 are arranged at regular intervals along the Y direction. The plate portion 310 may be implemented by a circular plate-shaped member instead of the square plate-shaped member.

An opening shape of the recessed portion 315 is a circle. Diameters Dp of the opening portions of respective recessed portions 315 are set to be the same. The diameter Dp of the opening portion of the recessed portion 315 is set to be the same as the nozzle diameter Dn. As a material of the plate portion 310, for example, epoxy glass can be used. The recessed portion 315 can be provided by performing a cutting process on the plate portion 310. The opening shape of the recessed portion 315 may be not a circle but a square or a polygon other than the square. The diameter Dp of the opening portion of the recessed portion 315 may be set larger than the nozzle diameter Dn, or may be set smaller than the nozzle diameter Dn. The diameter Dp of the opening portion of the recessed portion 315 is preferably set to be twice the nozzle diameter Dn or less.

Figure 8:
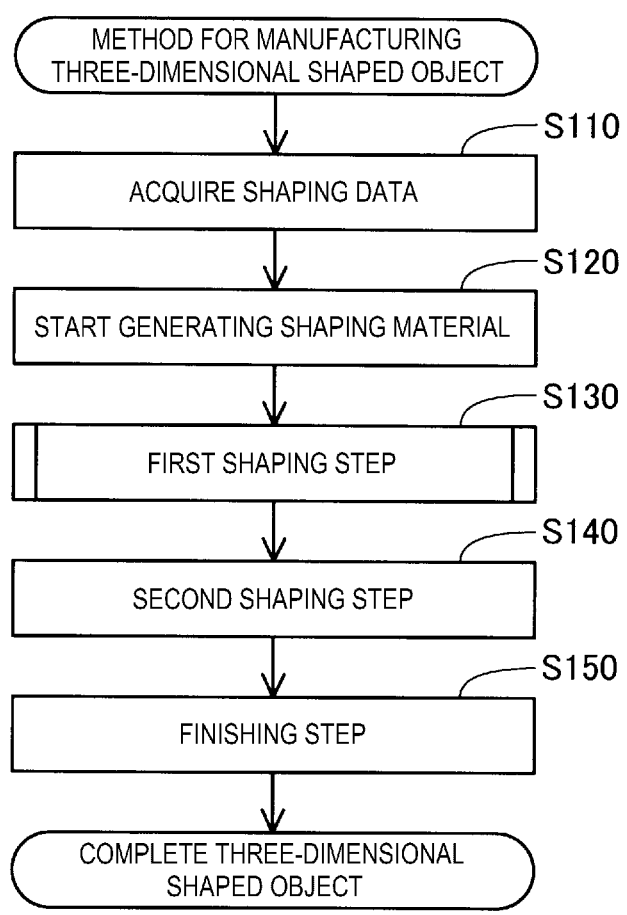
FIG. 8 is a flowchart showing a method for manufacturing the three-dimensional shaped object according to the first embodiment.

FIG. 8 is a flowchart showing a method for manufacturing the three-dimensional shaped object according to the present embodiment. When a predetermined start operation is performed by a user on an operation panel provided in the three-dimensional shaping device 100 or a computer connected to the three-dimensional shaping device 100, the shaping process is performed by the control unit 500. By executing the shaping process, the three-dimensional shaping device 100 starts manufacturing the three-dimensional shaped object.

First, in a data acquisition step of step S110, the control unit 500 acquires shaping data for shaping the three-dimensional shaped object. The shaping data is acquired from a computer or a recording medium connected to the three-dimensional shaping device 100, for example. The shaping data is data for shaping the three-dimensional shaped object by the three-dimensional shaping device 100. The shaping data represents various information such as a movement path of the nozzle hole 69 with respect to the stage 300, a target speed of movement of the nozzle hole 69 with respect to the stage 300, a target flow rate of the shaping material discharged from the nozzle hole 69 during movement, a target rotation speed of the drive motor 32 for rotating the flat screw 40, a target temperature of the heater 58 provided in the barrel 50, and a target rotation angle of the valve portion 73 of the discharge amount adjusting mechanism 70. Shape data representing a shape of the three-dimensional shaped object created using three-dimensional CAD software or three-dimensional CG software is read into, for example, slicer software on a computer connected to the three-dimensional shaping device 100 to create the shaping data. Data in an STL format or an AMF format can be used for the shape data read into the slicer software.

Next, in a material generation step of step S120, the control unit 500 starts generating a shaping material. The control unit 500 controls the rotation of the flat screw 40 and the temperature of the heater 58 provided in the barrel 50 according to the acquired shaping data, so as to melt the material and generate the shaping material. By the rotation of the flat screw 40, the material supplied from the material supply unit 20 is introduced into the groove portion 45 from the material introduction port 44 of the flat screw 40. The material introduced into the groove portion 45 is transported along the groove portion 45 to the central portion 47. The material transported in the groove portion 45 is sheared by a relative rotation of the flat screw 40 and the barrel 50, and at least a portion of the material is melted by heating with the heater 58 to become the paste-shaped shaping material having fluidity. The shaping material collected in the central portion 47 is supplied to the nozzle 61 via the communication hole 56 by an internal pressure generated in the central portion 47. The shaping material continues to be generated while a first shaping step and a second shaping step are performed.

Figure 9:
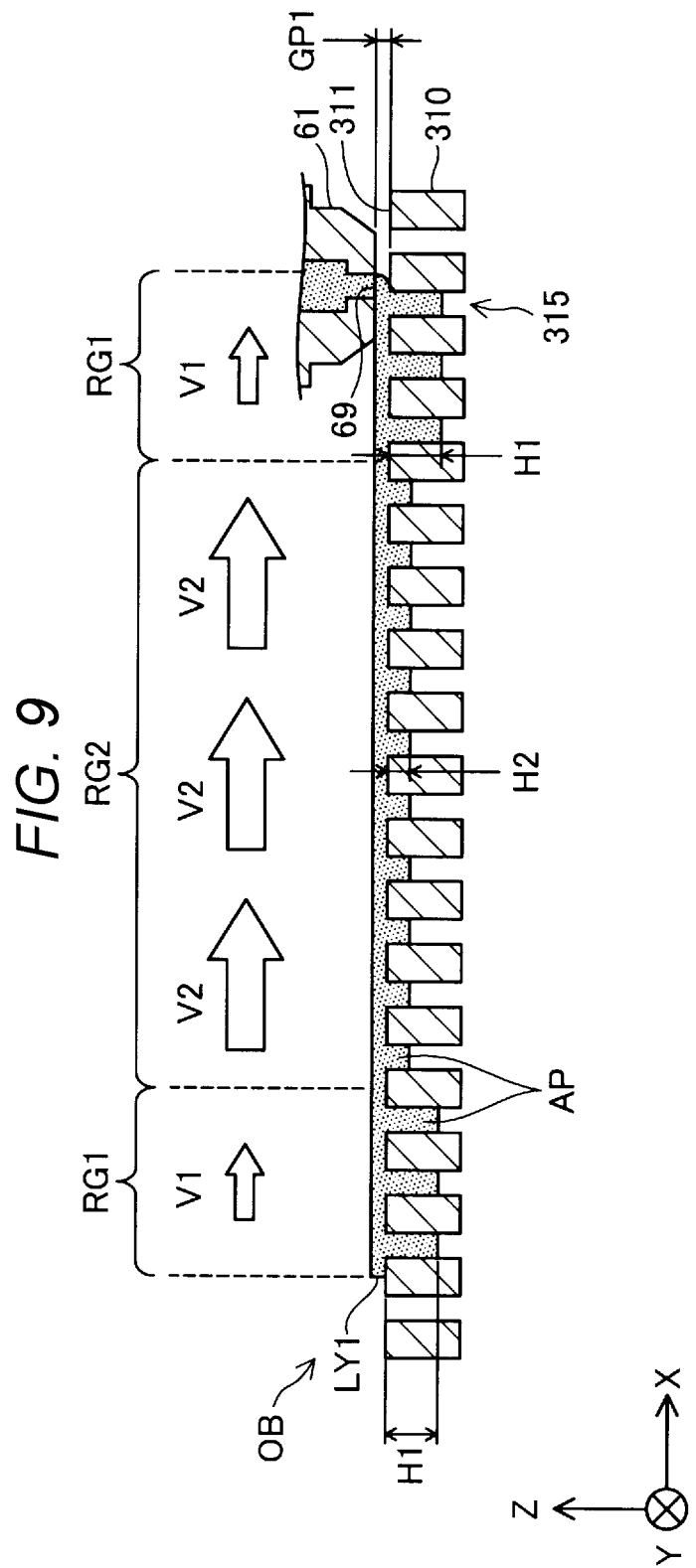
FIG. 9 is a diagram showing a state of a first shaping step according to the first embodiment.

FIG. 9 is a diagram showing a state of the first shaping step according to the present embodiment. FIG. 9 shows a state where a first layer LY1 of the three-dimensional shaped object OB is formed as viewed from a side surface of the stage 300. With reference to FIGS. 8 and 9, in the first shaping step of step S130, the control unit 500 forms the first layer LY1 in contact with the plate portion 310 by changing the relative position between the nozzle hole 69 and the stage 300 while discharging the shaping material from the nozzle hole 69 of the discharge unit 60 toward the stage 300 provided with the recessed portion 315. According to the present embodiment, the control unit 500 forms the first layer LY1 by controlling the moving mechanism 400 to change the relative position between the nozzle hole 69 and the stage 300 while controlling the discharge amount adjusting mechanism 70 to discharge the shaping material from the nozzle hole 69 toward the stage 300 using the shaping data.

A part of the shaping material discharged from the nozzle hole 69 toward the stage 300, that is, a part of the first layer LY1 enters the recessed portion 315. The portion of the first layer LY1 entering the recessed portion 315 is called a protrusion portion AP. More detailed contents of the first shaping step will be described later.

Figure 10:
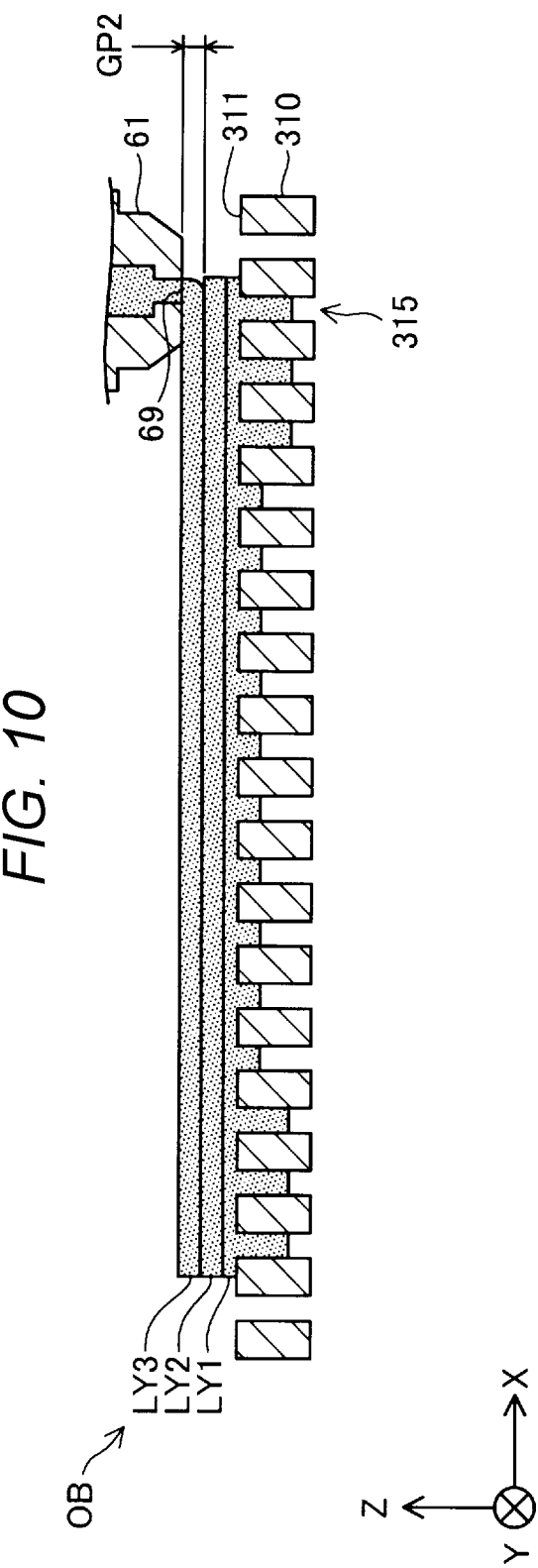
FIG. 10 is a diagram showing a state of a second shaping step according to the first embodiment.

FIG. 10 is a diagram showing a state of the second shaping step according to the present embodiment. FIG. 10 shows, as an example, a state where a second layer LY2 and a third layer LY3 of the three-dimensional shaped object OB are formed as viewed from the side surface of the stage 300. With reference to FIGS. 8 and 10, in the second shaping step of step S140, the control unit 500 stacks one or more layers on the first layer LY1 by changing the relative position between the nozzle hole 69 and the stage 300 while discharging the shaping material from the nozzle hole 69 toward the first layer LY1. According to the present embodiment, the control unit 500 stacks one or more layers on the first layer LY1 by controlling the moving mechanism 400 to change the relative position between the nozzle hole 69 and the stage 300 while controlling the discharge amount adjusting mechanism 70 to discharge the shaping material from the nozzle hole 69 toward the first layer LY1 using the shaping data.

With reference to FIG. 8, in a finishing step of step S150, the three-dimensional shaped object OB is removed from stage 300, and the protrusion portion AP is removed from three-dimensional shaped object OB. The three-dimensional shaped object OB is removed from the stage 300, for example, manually by the user. The protrusion portion AP is removed by performing, for example, a cutting process or a grinding process. In this way, a three-dimensional shaped object OB having a desired shape is manufactured.

Figure 11:
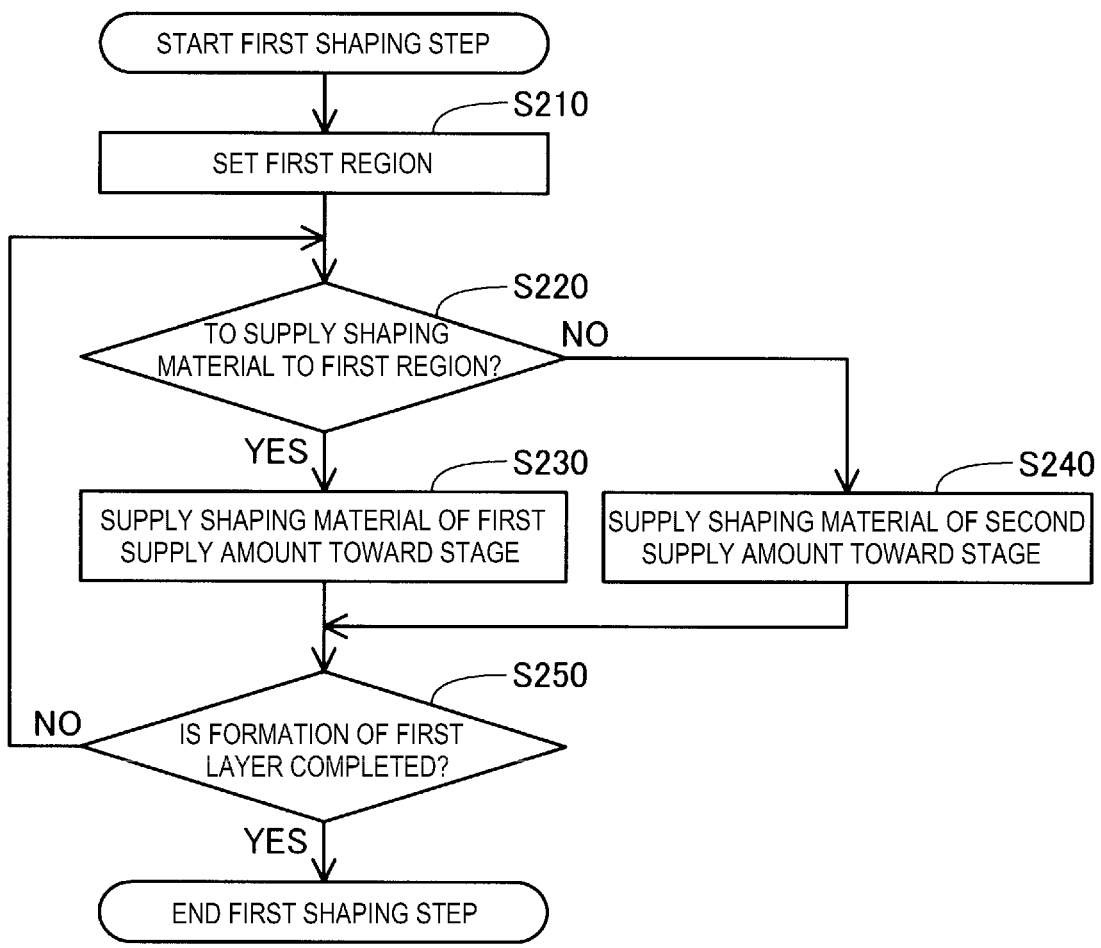
FIG. 11 is a flowchart showing contents of the first shaping step according to the first embodiment.

FIG. 11 is a flowchart showing contents of the first shaping step according to the present embodiment. According to the present embodiment, first, in step S210, the control unit 500 sets a first region RG1 and a second region RG2 on the stage 300 along the shaping surface 311.

Figure 12:
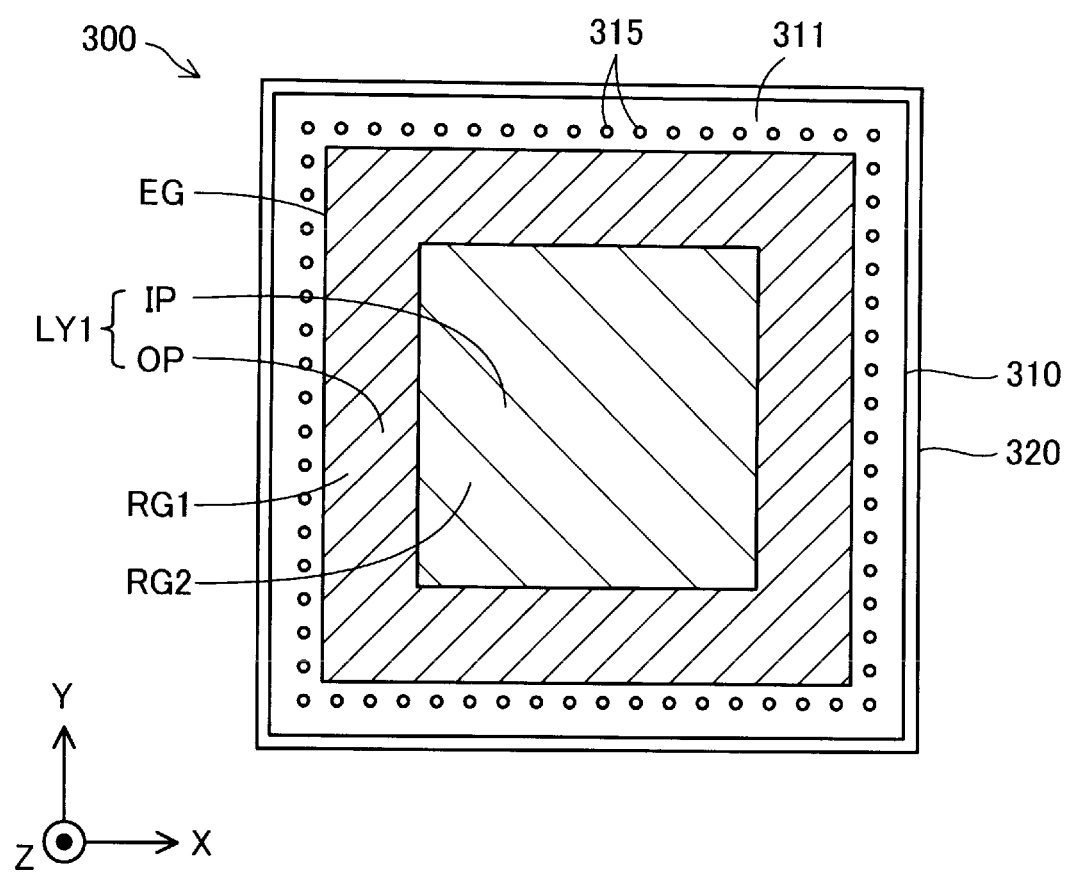
FIG. 12 is a diagram showing a first region and a second region according to the first embodiment.

FIG. 12 is a diagram showing the first region RG1 and the second region RG2 according to the present embodiment. FIG. 12 shows a part of the stage 300 as viewed from above. In FIG. 12, different types of hatching are applied to the first region RG1 and the second region RG2. The control unit 500 sets a region which is on the stage 300 and where an outer peripheral edge EG of the first layer LY1 is formed as the first region RG1, and sets a region on the stage 300 and different from the first region RG1 in a region where the first layer LY1 is formed as the second region RG2. The control unit 500 sets the first region RG1 and the second region RG2 such that the first region RG1 and the second region RG2 include a region on the recessed portion 315. According to the present embodiment, the control unit 500 sets a region where an outline portion OP of the first layer LY1 including the outer peripheral edge EG is formed as the first region RG1, and sets a region where a filling portion IP of the first layer LY1 is formed as the second region RG2. The outline portion OP means a portion of the first layer LY1 within a predetermined distance from the outer peripheral edge EG of the first layer LY1. The filling portion IP means a portion of the first layer LY1 excluding the outline portion OP. The control unit 500 can specify a region where the outer peripheral edge EG of the first layer LY1 is formed, a region where the outline portion OP is formed, and a region where the filling portion IP is formed on the stage 300 using the shaping data.

With reference to FIGS. 9 and 11, in step S220, the control unit 500 determines whether to supply the shaping material to the first region RG1. When it is determined to supply the shaping material to the first region RG1 in step S220, in step S230, the control unit 500 sets a supply amount of the shaping material supplied from the nozzle hole 69 to the first region RG1 per unit area to be larger than a supply amount according to the shaping data, and forms the first layer LY1. The supply amount of the shaping material supplied from the nozzle hole 69 to the first region RG1 per unit area is called a first supply amount S1. The first supply amount S1 is set to be larger than a second supply amount S2 described later. According to the present embodiment, the control unit 500 controls the moving mechanism 400 to make a first relative speed V1 which is a relative speed between the nozzle hole 69 and the first region RG1 slower than a target speed represented in the shaping data while controlling the discharge amount adjusting mechanism 70 to maintain a flow rate of the shaping material discharged from the nozzle hole 69 to be the same as a target flow rate represented in the shaping data. Therefore, the first supply amount S1 is larger than the supply amount according to the shaping data. For example, by controlling the moving mechanism 400, the control unit 500 can set the first relative speed V1 to half the target speed represented in the shaping data. In this case, the first supply amount S1 is twice the supply amount according to the shaping data.

On the other hand, in step S220, when it is determined not to supply the shaping material to the first region RG1, that is, when it is determined to supply the shaping material to the second region RG2, in step S240, the control unit 500 sets a supply amount of the shaping material supplied from the nozzle hole 69 to the second region RG2 per unit area to be the same as a supply amount according to the shaping data, and forms the first layer LY1. The supply amount of the shaping material supplied from the nozzle hole 69 to the second region RG2 per unit area is called the second supply amount S2. According to the present embodiment, the control unit 500 controls the moving mechanism 400 to maintain a second relative speed V2 which is a relative speed between the nozzle hole 69 and the second region RG2 to be the same as a target speed represented in the shaping data while control ling the discharge amount adjusting mechanism 70 to maintain a flow rate of the shaping material discharged from the nozzle hole 69 to be the same as a target flow rate represented in the shaping data. Therefore, the second supply amount S2 is the same as the supply amount according to the shaping data.

Thereafter, in step S250, the control unit 500 determines whether the formation of the first layer LY1 is completed. The control unit 500 can determine whether the formation of the first layer LY1 is completed using the shaping data. When it is determined that the formation of the first layer LY1 is not completed, the control unit 500 returns the processing to step S220, and continues the formation of the first layer LY1. On the other hand, when it is determined that the formation of the first layer LY1 is completed, the control unit 500 ends the first shaping step and starts the second shaping step as shown in FIG. 8.

With reference to FIGS. 9 and 10, according to the present embodiment, in the first shaping step, the control unit 500 controls the moving mechanism 400 to set an interval between a tip portion of the nozzle 61 and the stage 300 to a first interval GP1 when discharging the shaping material from the nozzle hole 69 toward the stage 300. In the second shaping step, the control unit 500 controls the moving mechanism 400 to set an interval between the tip portion of the nozzle 61 and a layer of the shaping material to a second interval GP2 when discharging the shaping material from the nozzle hole 69 toward the stage 300. That is, the control unit 500 sets the interval between the tip portion of the nozzle 61 and the stage 300 to the first interval GP1 when forming the first layer LY1, sets the interval between the tip of the nozzle 61 and the first layer LY1 to the second interval GP2 when forming the second layer LY2, and sets the interval between the tip portion of the nozzle 61 and the second layer LY2 to the second interval GP2 when forming the third layer LY3. The first interval GP1 is set to be narrower than the second interval GP2. The first interval GP1 and the second interval GP2 are set to be narrower than the nozzle diameter Dn. Therefore, when the nozzle 61 moves with respect to the stage 300, the shaping material deposited on the stage 300 is pressed against the stage 300 by the tip portion of the nozzle 61.

With reference to FIG. 9, according to the present embodiment, as described above, since the first supply amount S1 is set to be larger than the second supply amount S2, a length of the protrusion portion AP formed in the recessed portion 315 of the first region RG1 is longer than a length of the protrusion portion AP formed in the recessed portion 315 of the second region RG2. That is, a depth H1 from the shaping surface 311 of the shaping material entering the recessed portion 315 of the first region RG1 is deeper than a depth H2 from the shaping surface 311 of the shaping material entering the recessed portion 315 of the second region RG2.

Figure 13:
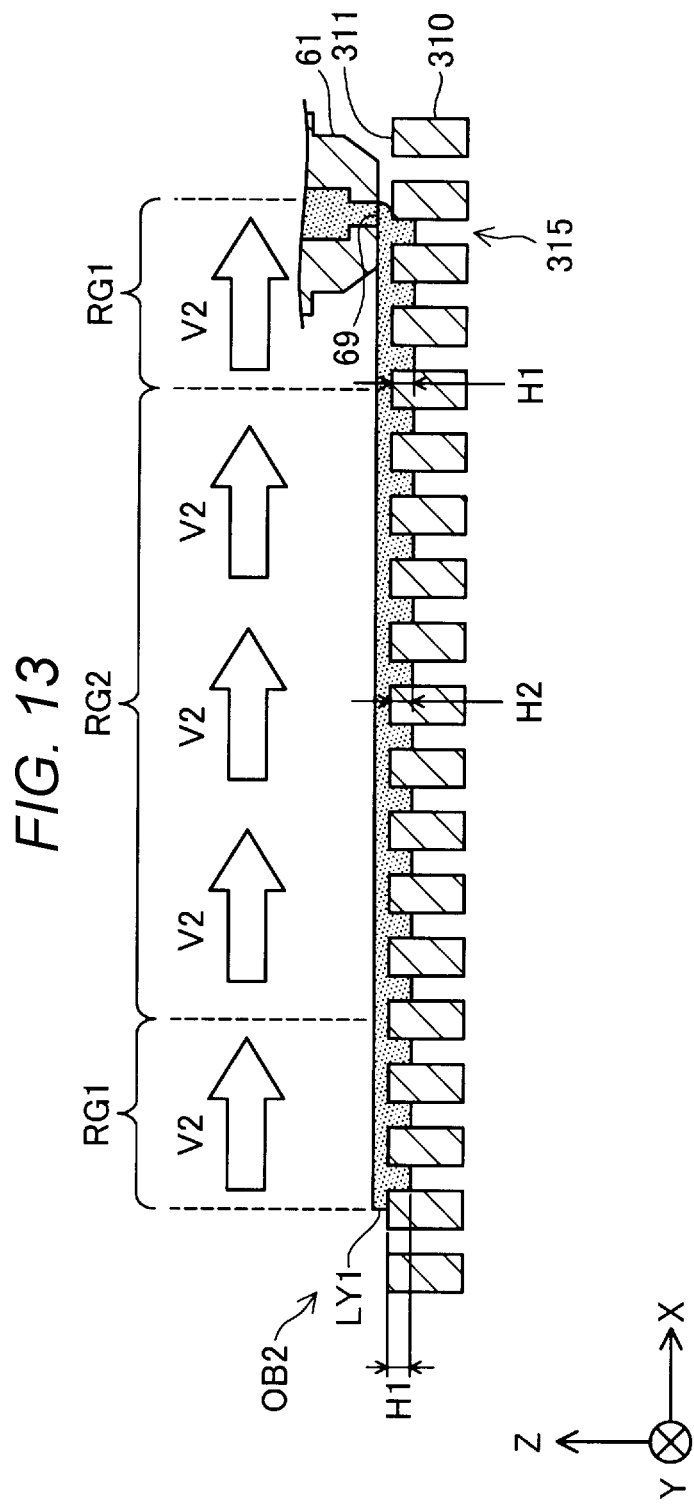
FIG. 13 is a diagram showing a first layer of a three-dimensional shaped object according to a comparative example.

FIG. 13 is a diagram showing the first layer LY1 of a three-dimensional shaped object OB2 according to a comparative example. When the first supply amount S1 is the same as the second supply amount S2, as shown in FIG. 13, the length of the protrusion portion AP formed in the recessed portion 315 of the first region RG1 is the same as the length of the protrusion portion AP formed in the recessed portion 315 of the second region RG2. That is, the depth H1 from the shaping surface 311 of the shaping material entering the recessed portion 315 of the first region RG1 is the same as the depth H2 from the shaping surface 311 of the shaping material entering the recessed portion 315 of the second region RG2.

According to the three-dimensional shaping device 100 of the present embodiment described above, since the control unit 500 sets, in the first shaping step, the first supply amount S1 which is the supply amount of the shaping material supplied from the nozzle hole 69 to the first region RG1 per unit area to be larger than the second supply amount S2 which is the supply amount of the shaping material supplied from the nozzle hole 69 to the second region RG2 per unit area and forms the first layer LY1, the depth H1 of the shaping material entering the recessed portion 315 of the first region RG1 where the three-dimensional shaped object OB is likely to warp can be made deeper than the depth H2 of the shaping material entering the recessed portion 315 of the second region RG2. Therefore, an anchor effect obtained by the shaping material entering the recessed portion 315 of the first region RG1 can be enhanced, so that warpage of the three-dimensional shaped object OB can be reduced.

According to the present embodiment, in the first shaping step, the control unit 500 makes the first supply amount S1 larger than the second supply amount S2 by controlling the moving mechanism 400 to make the first relative speed V1 slower than the second relative speed V2. Therefore, even when the flow rate of the shaping material discharged from the nozzle hole 69 cannot be increased, the first supply amount S1 can be made larger than the second supply amount S2.

According to the present embodiment, in the first shaping step, the control unit 500 forms the first layer LY1 by controlling the moving mechanism 400 to make the first interval GP1 narrower than the nozzle diameter Dn while pressing the shaping material deposited on the stage 300 against the stage 300 by the tip portion of the nozzle 61. Therefore, the shaping material can be pushed into the recessed portion 315 by the tip portion of the nozzle 61, so that the shaping material can be more likely to enter the recessed portion 315.

According to the present embodiment, after the second shaping step, in the finishing step, the three-dimensional shaped object OB is removed from stage 300, and the protrusion portion AP is removed from the three-dimensional shaped object OB. Therefore, the unnecessary protrusion portion AP is removed, and the three-dimensional shaped object OB can be approximated to a desired shape.

According to the present embodiment, a pellet-shaped ABS resin is used as the material, whereas as a material used in the shaping unit 200, for example, a material for shaping a three-dimensional shaped object using various materials such as a material having thermoplasticity, a metal material, and a ceramic material as a main material can also be used. Here, the "main material" means a central material for forming a shape of the three-dimensional shaped object, and a material occupying a content of 50% by weight or more in the three-dimensional shaped object. The above shaping materials include those in which main materials are melted alone, and those in which some of the contained components are melted together with the main materials to form a paste.

When a material having thermoplasticity is used as the main material, a shaping material is generated by plasticizing the material in the melting unit 30. The "plasticizing" means that a material having thermoplasticity is heated and melted. The "melting" also means that a material having thermoplasticity is softened by being heated to a temperature equal to or higher than a glass transition point thereof, and exhibits fluidity.

As a material having thermoplasticity, for example, a thermoplastic resin material obtained by combining one or more of the following can be used.

Example of Thermoplastic Resin Material

General-purpose engineering plastics such as a polypropylene resin (PP), a polyethylene resin (PE), a polyacetal resin (POM), a polyvinyl chloride resin (PVC), a polyamide resin (PA), an acrylonitrile-butadiene-styrene resin (ABS), a polylactic acid resin (PLA), a polyphenylene sulfide resin (PPS), polycarbonate (PC), modified polyphenylene ether, polybutylene terephthalate, and polyethylene terephthalate, and engineering plastics such as polysulfone, polyethersulfone, polyphenylene sulfide, polyarylate, polyimide, polyamideimide, polyetherimide, and polyetheretherketone (PEEK)

The material having thermoplasticity may contain pigments, metals, ceramics, and an additive such as a wax, a flame retardant, an antioxidant, and a heat stabilizer. The material having thermoplasticity is plasticized and melted by the rotation of the flat screw 40 and the heating with the heater 58 in the melting unit 30. After the shaping material thus generated is discharged from the nozzle hole 69, the shaping material is cured due to a reduction in temperature.

It is desirable that the material having thermoplasticity is discharged from the nozzle hole 69 in a state where the material is heated to a temperature equal to or higher than the glass transition point thereof and is in a state of being completely melted. The "state of being completely melted" means a state where a non-melted material having thermoplasticity does not exist, and means a state where, for example, when a pellet-shaped thermoplastic resin is used as the material, a pellet-shaped solid does not remain.

In the shaping unit 200, for example, the following metal material may be used as a main material instead of the above material having thermoplasticity. In this case, it is desirable that a component to be melted at the time of forming the shaping material is mixed with a powder material obtained by converting the following metal material into a powder, and then the mixture is charged into the melting unit 30.

Example of Metal Material

A single metal of magnesium (Mg), iron (Fe), cobalt (Co) or chromium (Cr), aluminum (Al), titanium (Ti), copper (Cu), and nickel (Ni), or an alloy containing one or more of these metals Example of Alloy Maraging steel, stainless steel, cobalt chrome molybdenum, titanium alloy, nickel alloy, aluminum alloy, cobalt alloy, and cobalt chromium alloy In the shaping unit 200, a ceramic material can be used as a main material instead of the above metal material. As the ceramic material, for example, oxide ceramics such as silicon dioxide, titanium dioxide, aluminum oxide, and zirconium oxide, and non-oxide ceramics such as aluminum nitride can be used. When the above metal material or ceramic material is used as the main material, the shaping material disposed on the stage 300 may be cured by, for example, sintering with laser irradiation or warm air.

The powder material of the metal material or the ceramic material charged into the material supply unit 20 may be a mixed material obtained by mixing a plurality of types of powders of a single metal powder, an alloy powder, and a ceramic material powder. The powder material of the metal material or the ceramic material may be coated with, for example, the thermoplastic resin shown above or another thermoplastic resin. In this case, the thermoplastic resin may be melted in the melting unit 30 to exhibit fluidity.

For example, the following solvents can be added to the powder material of the metal material or the ceramic material charged into the material supply unit 20. The solvent can be used alone or in combination of two or more selected from the following.

Example of Solvent

Water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, isopropyl acetate, n-butyl acetate, and isobutyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohol such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate In addition, for example, the following binders can be added to the powder material of the metal material or the ceramic material charged into the material supply unit 20.

Example of Binder

Acrylic resin, epoxy resin, silicone resin, cellulose resin or other synthetic resins, or polylactic acid (PLA), polyamide (PA), polyphenylene sulfide (PPS), polyetheretherketone (PEEK) or other thermoplastic resins

B. Second Embodiment

Figure 14:
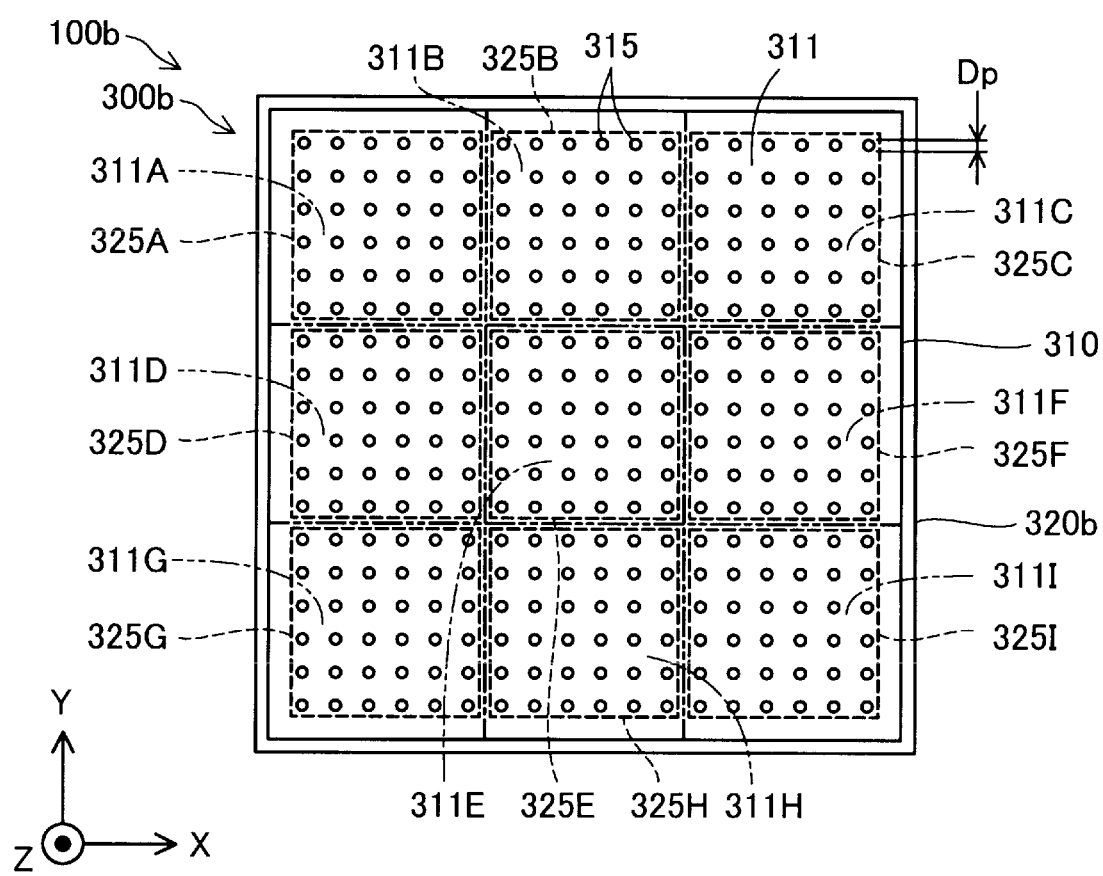
FIG. 14 is a top view showing a configuration of a stage on a shaping surface side according to a second embodiment.

FIG. 14 is a diagram showing a schematic configuration of a three-dimensional shaping device 100b according to a second embodiment. The three-dimensional shaping device 100b according to the second embodiment is different from the first embodiment in that a stage 300b is provided with temperature control heaters 325A to 325I. Other configurations are the same as those of the first embodiment shown in FIG. 1 unless otherwise specified.

According to the present embodiment, the shaping surface 311 on the stage 300b is divided into three surfaces along the X direction, and divided into three surfaces along the Y direction. Therefore, the shaping surface 311 is divided into nine shaping surfaces 311A to 311I with a shaping surface 311E as a center. Inside a base portion 320b, the temperature control heaters 325A to 325I are provided one by one below the shaping surfaces 311A to 311I. The temperature control heaters 325A to 325I heat the shaping surfaces 311A to 311I respectively. Temperatures of the temperature control heaters 325A to 325I are controlled by the control unit 500. In the following description, when the shaping surfaces 311A to 311I are described without particular distinction, they are simply called the shaping surface 311, and when the temperature control heaters 325A to 325I are described without particular distinction, they are simply called a temperature control heater 325.

According to the present embodiment, before the first shaping step, the control unit 500 specifies, among the shaping surfaces 311A to 311I, the shaping surface 311 on which the outline portion OP is formed and the shaping surface 311 on which the filling portion IP is formed, and controls the temperatures of the temperature control heaters 325A to 325I such that a temperature of the shaping surface 311 on which the outline portion OP is formed is higher than a temperature of the shaping surface 311 on which the filling portion IP is formed. The control unit 500 can use the shaping data to specify, among the shaping surfaces 311A to 311I, the shaping surface 311 on which the outline portion OP is formed and the shaping surface 311 on which the filling portion IP is formed. The temperature of the shaping surface 311 on which the outline portion OP is formed is set within a range from the glass transition point to a thermal decomposition temperature of the shaping material. After the temperatures of the shaping surfaces 311A to 311I reach a predetermined temperature, the control unit 500 starts the first shaping step.

According to the three-dimensional shaping device 100b of the present embodiment described above, since the control unit 500 controls the temperature control heaters 325A to 325I such that the temperature of the shaping surface 311 on which the outline portion OP is formed is higher than the temperature of the shaping surface 311 on which the filling portion IP is formed, fluidity of the shaping material supplied to form the outline portion OP can be higher than fluidity of the shaping material supplied to form the filling portion IP. Therefore, when forming the outline portion OP, the shaping material can more easily enter the recessed portion 315 than when forming the filling portion IP.

Figure 15:
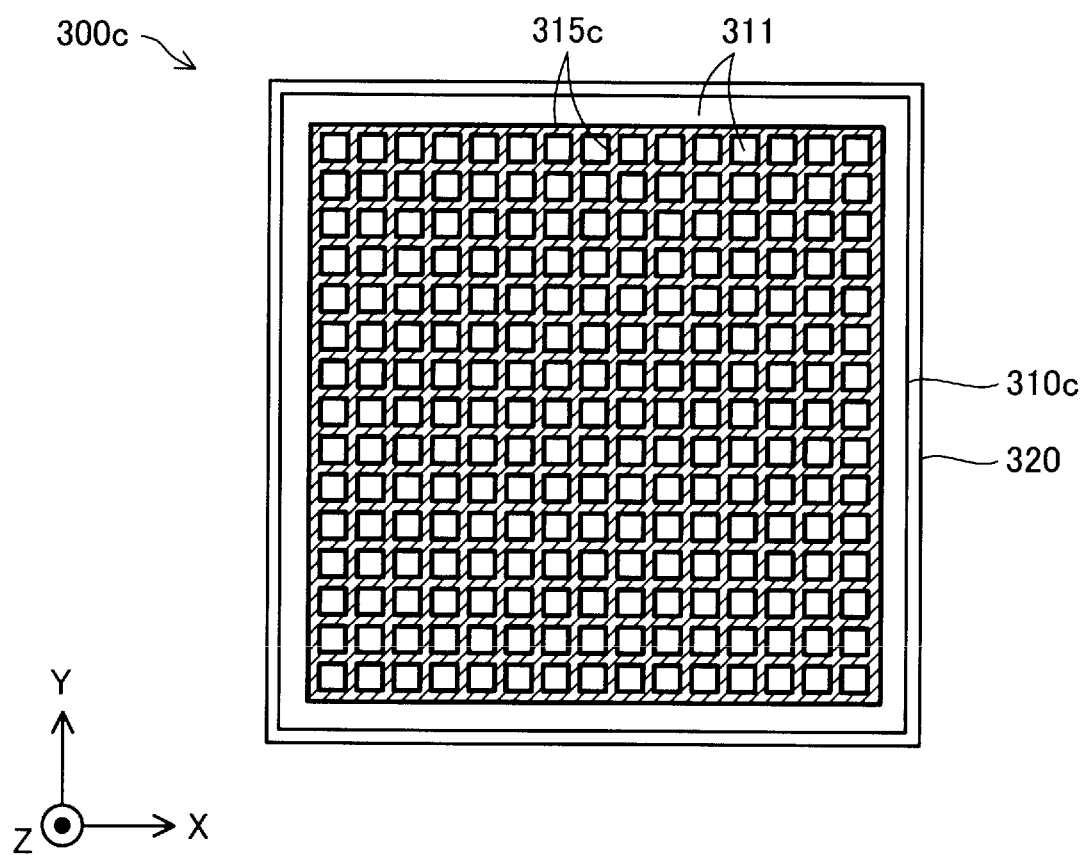
FIG. 15 is a top view showing a configuration of a stage on a shaping surface side according to another embodiment.

C. Other Embodiments (C1) FIG. 15 is a top view showing a configuration of a stage 300c on the shaping surface 311 side according to another embodiment. According to the three-dimensional shaping devices 100 and 100b of the above embodiments, the recessed portion 315 of the stages 300 and 300b is formed by a plurality of through holes provided in the plate portion 310. In contrast, as shown in FIG. 15, a plate portion 310c of the stage 300c is not provided with the through holes, and a recessed portion 315c is formed by grooves in a grid in the plate portion 310c. A shape of the groove provided in the plate portion 310c is not limited to the grid, but may be, for example, a concentric circular shape.

Figure 16:
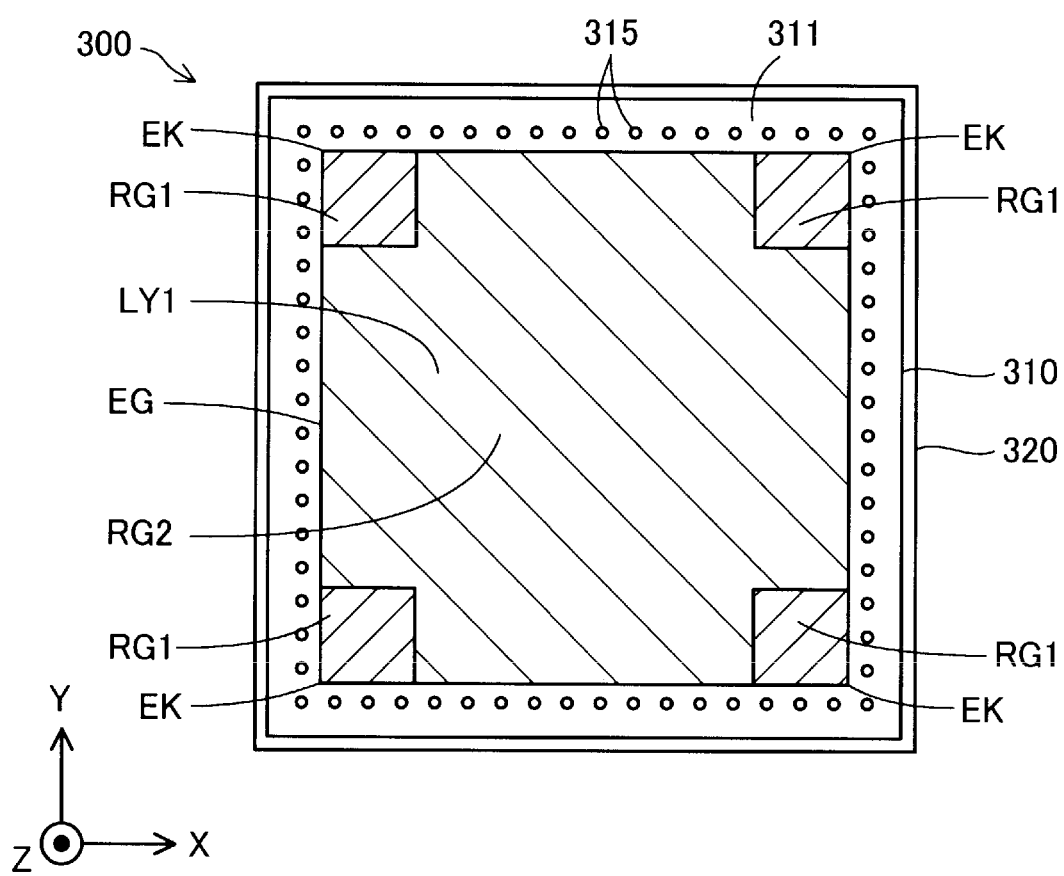
FIG. 16 is a diagram showing a first region and a second region according to another embodiment.

(C2) FIG. 16 is a diagram showing the first region RG1 and the second region RG2 according to another embodiment. As shown in FIG. 16, the control unit 500 may set, as the first region RG1, a region which is on the stage 300 and on which a bent portion EK where the outer peripheral edge EG is bent is formed. Also in this case, the control unit 500 sets the first region RG1 so as to include the region on the recessed portion 315. For example, the control unit 500 can use the shaping data to specify a portion where the outer peripheral edge EG is bent by a predetermined angle or more, and set the first region RG1 so as to include a region where the portion of the specified outer peripheral edge EG is formed. In this case, since a large amount of the shaping material can be supplied to the region where the bent portion EK that is particularly likely to be warped is formed, it is possible to effectively reduce the warpage of the three-dimensional shaped object OB.

(C3) According to the three-dimensional shaping devices 100 and 100b of the above embodiments, the control unit 500 makes the first supply amount S1 larger than the second supply amount S2 by controlling the moving mechanism 400 to adjust the relative speed between the nozzle hole 69 and the shaping surface 311. In contrast, the control unit 500 may make the first supply amount S1 larger than the second supply amount S2 by controlling the discharge amount adjusting mechanism 70 to adjust the flow rate of the shaping material discharged from the nozzle hole 69. In this case, the first supply amount S1 can be easily made larger than the second supply amount S2 by simple control. The control unit 500 may make the first supply amount S1 larger than the second supply amount S2 by adjusting both the relative speed between the nozzle hole 69 and the shaping surface 311 and the flow rate of the shaping material discharged from the nozzle hole 69.

(C4) According to the three-dimensional shaping devices 100 and 100b of the above embodiments, the control unit 500 may make the first supply amount S1 larger than the second supply amount S2 by controlling the drive motor 32 to increase a rotation speed of the flat screw 40 and by adjusting the flow rate of the shaping material from the nozzle hole 69.

(C5) According to the three-dimensional shaping devices 100 and 100b of the above embodiments, the control unit 500 forms the first layer LY1 by controlling the moving mechanism 400 to make the first interval GP1 narrower than the nozzle diameter Dn while pressing the shaping material deposited on the stage 300 against the stage 300 by the tip portion of the nozzle 61. In contrast, the control unit 500 may control the moving mechanism 400 to make the first interval GP1 wider than the nozzle diameter Dn in the first shaping step. That is, when forming the first layer LY1, the control unit 500 may not press the shaping material deposited on the stage 300 against the stage 300 by the tip portion of the nozzle 61.

(C6) According to the three-dimensional shaping devices 100 and 100b of the above embodiments, the control unit 500 controls the moving mechanism 400 to make the first interval GP1 in the first shaping step narrower than the second interval GP2 in the second shaping step. In contrast, the control unit 500 may control the moving mechanism 400 to make the first interval GP1 in the first shaping step the same as the second interval GP2 in the second shaping step.

(C7) According to the three-dimensional shaping devices 100 and 100*b* of the above embodiments, the control unit 500 controls the moving mechanism 400 to maintain the first interval GP1 constant in the first shaping step. In contrast, the control unit 500 may control the moving mechanism 400 to make the interval between the tip portion of the nozzle 61 and the stages 300 and 300*b* when supplying the shaping material to the first region RG1 narrower than the interval between the tip portion of the nozzle 61 and the stages 300 and 300*b* when supplying the shaping material to the second region RG2. In this case, the depth H1 of the shaping material entering the recessed portion 315 of the first region RG1 can be further deeper than the depth H2 of the shaping material entering the recessed portion 315 of the second region RG2.

(C8) According to the above embodiments, the protrusion portion AP may not be removed from the three-dimensional shaped object OB. For example, when the use of the three-dimensional shaped object OB does not matter even when the protrusion portion AP is not removed, the protrusion portion AP may not be removed from the three-dimensional shaped object OB.

(C9) According to the above embodiments, when the shaping data is generated, the first region RG1 and the second region RG2 may be set, and the shaping data in which the first supply amount S1 is larger than the second supply amount S2 may be set in advance. In this case, for example, in step S230 shown in FIG. 11, the control unit 500 sets the supply amount of the shaping material supplied from the nozzle hole 69 to the first region RG1 per unit area to be the same amount as the supply amount according to the shaping data and forms the first layer LY1, and sets the supply amount of the shaping material supplied from the nozzle hole 69 to the second region RG2 per unit area to be the same amount as a supply amount according to the shaping data and forms the first layer LY1, so that the first supply amount S1 can be made larger than the second supply amount S2.

(C10) According to the three-dimensional shaping devices 100 and 100*b* of the above embodiments, the melting unit 30 includes the flat screw 40 and the barrel 50, and melts the material using the relative rotation of the flat screw 40 and the barrel 50. In contrast, the melting unit 30 may include, instead of the flat screw 40, an inline screw in which a spiral groove is formed in a long shaft and a cylindrical barrel surrounding the inline screw, and may have a form in which the material is melted using a relative rotation of the inline screw and the cylindrical barrel.

(C11) According to the above embodiments, the three-dimensional shaping devices 100 and 100*b* that include the flat screw 40 and the barrel 50, and that melt the material using the relative rotation of the flat screw 40 and the barrel 50 are used. In contrast, a fused deposition modeling (FDM) three-dimensional shaping device may be used. In this case, the first supply amount S1 may be made larger than the second supply amount S2 by adjusting a feed speed of a filament used as the material.

D. Other Embodiments

The present disclosure is not limited to the embodiments described above, and can be implemented in various forms without departing from the scope of the present disclosure. For example, the present disclosure can be implemented by the following aspects. In order to solve some or all of the problems described in the present disclosure, or to achieve some or all of the effects of the present disclosure, technical characteristics in the above embodiments corresponding to the technical characteristics in each of the embodiments described below can be appropriately replaced or combined. If the technical characteristics are not described as essential in the present description, they can be deleted as appropriate.

(1) According to a first embodiment of the present disclosure, a method for manufacturing a three-dimensional shaped object is provided. The method for manufacturing a three-dimensional shaped object includes: a first shaping step of forming a first layer in contact with a stage provided with a plurality of recessed portions by changing a relative position between a discharge unit and the stage while discharging a molten material from the discharge unit toward the stage; and a second shaping step of stacking one or more layers on the first layer by changing the relative position between the discharge unit and the stage while discharging the molten material from the discharge unit toward the first layer. The stage has a first region where an outer peripheral edge of the first layer is formed and a second region different from the first region in a region where the first layer is formed, and in the first shaping step, the first layer is formed by making a first supply amount which is a supply amount of the molten material supplied from the discharge unit to the first region per unit area larger than a second supply amount which is a supply amount of the molten material supplied from the discharge unit to the second region per unit area.

According to the method for manufacturing a three-dimensional shaped object in this embodiment, a depth of the molten material entering the recessed portion of the first region where the three-dimensional shaped object is likely to warp can be made deeper than a depth of the molten material entering the recessed portion of the second region. Therefore, it is possible to reduce the warpage of the three-dimensional shaped object due to the anchor effect.

(2) In the method for manufacturing a three-dimensional shaped object according to the above embodiment, in the first shaping step, the first supply amount may be made larger than the second supply amount by making a first flow rate of the molten material discharged from the discharge unit toward the first region larger than a second flow rate of the molten material discharged from the discharge unit toward the second region.

According to the method for manufacturing a three-dimensional shaped object in this embodiment, the first supply amount can be easily made larger than the second supply amount.

(3) In the method for manufacturing a three-dimensional shaped object according to the above embodiment, in the first shaping step, the first supply amount may be made larger than the second supply amount by making a first relative speed between the discharge unit and the stage when discharging the molten material from the discharge unit toward the first region slower than a second relative speed between the discharge unit and the stage when discharging the molten material from the discharge unit toward the second region.

According to the method for manufacturing a three-dimensional shaped object in this embodiment, even when a flow rate of the molten material discharged from the discharge unit cannot be increased, the first supply amount can be made larger than the second supply amount.

(4) In the method for manufacturing a three-dimensional shaped object according to the above embodiment, in the first shaping step, the first layer may be formed while pressing the molten material supplied to the stage against the stage by a tip portion of the discharge unit.

According to the method for manufacturing a three-dimensional shaped object in this embodiment, in the first shaping step, the molten material can be more likely to enter the recessed portion.

(5) In the method for manufacturing a three-dimensional shaped object according to the above embodiment, an interval between the discharge unit and the stage when discharging the molten material from the discharge unit toward the first region in the first shaping step may be made narrower than an interval between the discharge unit and the stage when discharging the molten material from the discharge unit toward the second region in the first shaping step.

According to the method for manufacturing a three-dimensional shaped object in this embodiment, the depth of the molten material entering the recessed portion of the first region can be deeper than the depth of the molten material entering the recessed portion of the second region.

(6) In the method for manufacturing a three-dimensional shaped object according to the above embodiment, a region where a bent portion of the outer peripheral edge is formed may be set as the first region.

According to the method for manufacturing a three-dimensional shaped object in this embodiment, since a large amount of the molten material can be supplied to the region where the bent portion that is particularly likely to be warped is formed, it is possible to effectively reduce the warpage of the three-dimensional shaped object.

(7) The method for manufacturing a three-dimensional shaped object according to the above embodiment may further include, after the second shaping step, removing a protrusion portion of the first layer formed by the molten material entering the recessed portions.

According to the method for manufacturing a three-dimensional shaped object in this embodiment, the three-dimensional shaped object can be approximated to a desired shape by removing the protrusion portion which becomes unnecessary after removing the three-dimensional shaped object from the stage.

(8) The method for manufacturing a three-dimensional shaped object according to the above embodiment may further include, before the first shaping step, heating the stage in the first region.

According to the method for manufacturing a three-dimensional shaped object in this embodiment, since fluidity of the molten material can be enhanced, the molten material can easily enter the recessed portion.

The present disclosure can be implemented in various forms other than the method for manufacturing a three-dimensional shaped object. For example, the present disclosure can be implemented in forms of a three-dimensional shaping device and a method for controlling the three-dimensional shaping device.

What is claimed is:

1. A method for manufacturing a three-dimensional shaped object, comprising:
    a first shaping step of forming a first layer in contact with a stage provided with a plurality of recessed portions by changing a relative position between a discharge unit and the stage while discharging a molten material from the discharge unit toward the stage; and
    a second shaping step of stacking one or more layers on the first layer by changing the relative position between the discharge unit and the stage while discharging the molten material from the discharge unit toward the first layer, wherein
    the stage has a first region where an outer peripheral edge of the first layer is formed and a second region different from the first region in a region where the first layer is formed, and
    in the first shaping step, the first layer is formed by making a first supply amount which is a supply amount of the molten material supplied from the discharge unit to the first region per unit area larger than a second supply amount which is a supply amount of the molten material supplied from the discharge unit to the second region per unit area.

2. The method for manufacturing a three-dimensional shaped object according to claim 1, wherein
    in the first shaping step, the first supply amount is made larger than the second supply amount by making a first flow rate of the molten material discharged from the discharge unit toward the first region larger than a second flow rate of the molten material discharged from the discharge unit toward the second region.

3. The method for manufacturing a three-dimensional shaped object according to claim 1, wherein
    in the first shaping step, the first supply amount is made larger than the second supply amount by making a first relative speed between the discharge unit and the stage when discharging the molten material from the discharge unit toward the first region slower than a second relative speed between the discharge unit and the stage when discharging the molten material from the discharge unit toward the second region.

4. The method for manufacturing a three-dimensional shaped object according to claim 1, wherein
    in the first shaping step, the first layer is formed while pressing the molten material supplied to the stage against the stage by a tip portion of the discharge unit.

5. The method for manufacturing a three-dimensional shaped object according to claim 4, wherein
    an interval between the discharge unit and the stage when discharging the molten material from the discharge unit toward the first region in the first shaping step is made narrower than an interval between the discharge unit and the stage when discharging the molten material from the discharge unit toward the second region in the first shaping step.

6. The method for manufacturing a three-dimensional shaped object according to claim 1, wherein
    a region where a bent portion of the outer peripheral edge is formed is set as the first region.

7. The method for manufacturing a three-dimensional shaped object according to claim 1, further comprising:
    after the second shaping step, removing a protrusion portion of the first layer formed by the molten material entering the recessed portions.

8. The method for manufacturing a three-dimensional shaped object according to claim 1, further comprising:
    before the first shaping step, heating the stage in the first region.

9. A three-dimensional shaping device comprising:
    a discharge unit configured to discharge a molten material toward a stage provided with a plurality of recessed portions;
    a moving mechanism configured to change a relative position between the discharge unit and the stage; and
    a control unit configured to execute a first shaping control for forming a first layer in contact with the stage by changing a relative position between the discharge unit and the stage while discharging the molten material from the discharge unit toward the stage and a second shaping control for stacking one or more layers on the first layer by changing the relative position between the discharge unit and the stage while discharging the molten material from the discharge unit toward the first layer, wherein the stage has a first region where an outer peripheral edge of the first layer is formed and a second region different from the first region in a region where the first layer is formed, and in the first shaping step, the control unit forms the first layer by making a first supply amount which is a supply amount of the molten material supplied from the discharge unit to the first region per unit area larger than a second supply amount which is a supply amount of the molten material supplied from the discharge unit to the second region per unit area.

* * * * *